US012527539B2

United States Patent
Hannemann et al.

(10) Patent No.: US 12,527,539 B2
(45) Date of Patent: Jan. 20, 2026

(54) DOSE CONTROL METHOD FOR A MOBILE X-RAY DETECTOR OF A MEDICAL X-RAY SYSTEM USING CALCULATED LATENCY

(71) Applicant: Siemens Healthineers AG, Forchheim (DE)

(72) Inventors: Thilo Hannemann, Erlangen (DE); Thomas Pfeiffer, Adelsdorf (DE); Thomas Weber, Hausen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 92 days.

(21) Appl. No.: 18/478,675

(22) Filed: Sep. 29, 2023

(65) Prior Publication Data
US 2024/0108301 A1 Apr. 4, 2024

(30) Foreign Application Priority Data
Sep. 30, 2022 (DE) ...................... 10 2022 210 440.4

(51) Int. Cl.
*A61B 6/00* (2024.01)
*A61B 6/42* (2024.01)

(52) U.S. Cl.
CPC ............ *A61B 6/542* (2013.01); *A61B 6/4233* (2013.01)

(58) Field of Classification Search
CPC ............................... A61B 6/4233; A61B 6/542
See application file for complete search history.

(56) References Cited

U.S. PATENT DOCUMENTS

| | | | | |
|---|---|---|---|---|
| 2003/0081734 A1* | 5/2003 | Nicolas | ................ | A61B 6/0487 378/205 |
| 2008/0253532 A1* | 10/2008 | Hess | ........................ | H05G 1/32 378/108 |
| 2010/0002831 A1* | 1/2010 | Maack | ................... | A61B 6/542 378/154 |
| 2012/0195408 A1* | 8/2012 | Walk | ........................ | H05G 1/40 378/165 |
| 2014/0105356 A1* | 4/2014 | Yin | ........................ | G01N 23/04 378/62 |

(Continued)

FOREIGN PATENT DOCUMENTS

| | | |
|---|---|---|
| DE | 102010033609 B3 | 12/2011 |
| DE | 102012201452 A1 | 8/2013 |
| DE | 102015205867 A1 | 8/2016 |

OTHER PUBLICATIONS

Standard IEEE 802.11-2007; Parts A-M.
(Continued)

*Primary Examiner* — Blake C Riddick
(74) *Attorney, Agent, or Firm* — Harness, Dickey & Pierce, P.L.C.

(57) ABSTRACT

One or more example embodiments of the present invention relates to a dose control method for a mobile x-ray detector of a medical x-ray system, comprising generating a data packet having a time stamp of a clock of the mobile x-ray detector and a dose value; sending the data packet via a radio link from the mobile x-ray detector to an x-ray generator; receiving the data packet from the x-ray generator; comparing the time stamp with a clock of the x-ray generator and calculating a latency; and extrapolating an overall dose from the dose value, the time stamp and the latency.

20 Claims, 1 Drawing Sheet

(56) References Cited

U.S. PATENT DOCUMENTS

| | | | | |
|---|---|---|---|---|
| 2014/0185751 A1* | 7/2014 | De Man | ............... | H05G 1/28 |
| | | | | 378/165 |
| 2014/0348288 A1* | 11/2014 | Boyd | ............... | A61B 6/405 |
| | | | | 378/4 |
| 2016/0220222 A1* | 8/2016 | Schroeter | ............... | A61B 6/585 |
| 2016/0287200 A1* | 10/2016 | Neumann | ............... | A61B 6/542 |
| 2016/0374641 A1* | 12/2016 | Ancar | ............... | A61B 6/587 |
| | | | | 378/206 |
| 2017/0038480 A1* | 2/2017 | Groepl | ............... | G01T 1/247 |
| 2017/0042489 A1* | 2/2017 | Boyd | ............... | A61B 6/025 |
| 2017/0172532 A1* | 6/2017 | Flohr | ............... | A61B 6/405 |
| 2018/0123716 A1* | 5/2018 | Eismann | ............... | A61B 6/42 |
| 2018/0259658 A1* | 9/2018 | Chaudhury | ............... | G01T 1/24 |
| 2018/0303452 A1* | 10/2018 | Bernhardt | ............... | A61B 6/5205 |
| 2019/0150864 A1* | 5/2019 | Flohr | ............... | G06T 5/70 |
| 2019/0239836 A1* | 8/2019 | Girouard | ............... | G01T 1/2018 |
| 2020/0128079 A1* | 4/2020 | Eismann | ............... | A61B 6/4266 |
| 2020/0205769 A1* | 7/2020 | Kotian | ............... | A61B 6/542 |
| 2020/0268340 A1* | 8/2020 | Nebosis | ............... | A61B 6/56 |
| 2021/0137482 A1* | 5/2021 | Bernhardt | ............... | G16H 40/63 |
| 2021/0225501 A1* | 7/2021 | Aguilar | ............... | G16H 40/60 |
| 2021/0236081 A1 | 8/2021 | Gebhardt et al. | | |
| 2022/0128714 A1* | 4/2022 | Miller | ............... | G01T 1/185 |
| 2023/0377724 A1* | 11/2023 | Vazquez Romaguera | ............... | |
| | | | | G16H 20/40 |
| 2024/0115882 A1* | 4/2024 | Freedman | ............... | G06T 7/38 |

OTHER PUBLICATIONS

IEEE 1588 Precision clock synchronization protocol for networked measurement and control systems; IEC 61588; XP002367391; IEEE; 2-8318-7541-2; 2004.

* cited by examiner

DOSE CONTROL METHOD FOR A MOBILE X-RAY DETECTOR OF A MEDICAL X-RAY SYSTEM USING CALCULATED LATENCY

CROSS-REFERENCE TO RELATED APPLICATION(S)

The present application claims priority under 35 U.S.C. § 119 to German Patent Application No. 10 2022 210 440.4, filed Sep. 30, 2022, the entire contents of which are incorporated herein by reference.

FIELD

One or more example embodiments of the present invention relates to a dose control method for a mobile x-ray detector of a medical x-ray system, a mobile x-ray detector and a medical x-ray system.

RELATED ART

With a radiographic recording, the detector used is to be exposed to the correct dose. Since the dose on the detector depends on the attenuation by the examined object, it is the prior art to measure the incoming radiation at defined points with a dose measuring chamber in front of the detector and on the basis of this measurement to shut off the x-ray generator as soon as the desired dose has been reached.

With a stationary detector, either a shut-off signal or the dose measured value is transmitted from the detector via a cable connection to the x-ray generator. There was previously no commercial solution for a portable, wireless detector, also known as mobile x-ray detector. The experimental approach is to transmit the previously used wired protocol via proprietary radio solutions with minimal latency and high reliability.

A method for estimating a radiation dose of an x-ray radiation and associated x-ray apparatus is known from the publication DE 10 2010 033 609 B3.

SUMMARY

A problem to be solved is to realize this function for a wireless, portable detector. In particular, a problem is to achieve a reliable shut-off even with an unreliable radio link.

One or more example embodiments of the present invention specifies a dose control method for a mobile x-ray detector of a medical x-ray system, a mobile x-ray detector and a medical x-ray system, which enable a more reliable dose control.

The object is achieved by a dose control method for a mobile x-ray detector of a medical x-ray system as claimed in claim 1, a mobile x-ray detector as claimed in claim 12 and an x-ray system as claimed in claim 13.

BRIEF DESCRIPTION OF THE DRAWINGS

Exemplary embodiments of the invention are described in greater detail below with reference to the drawings, in which.

DETAILED DESCRIPTION

Figure 1:
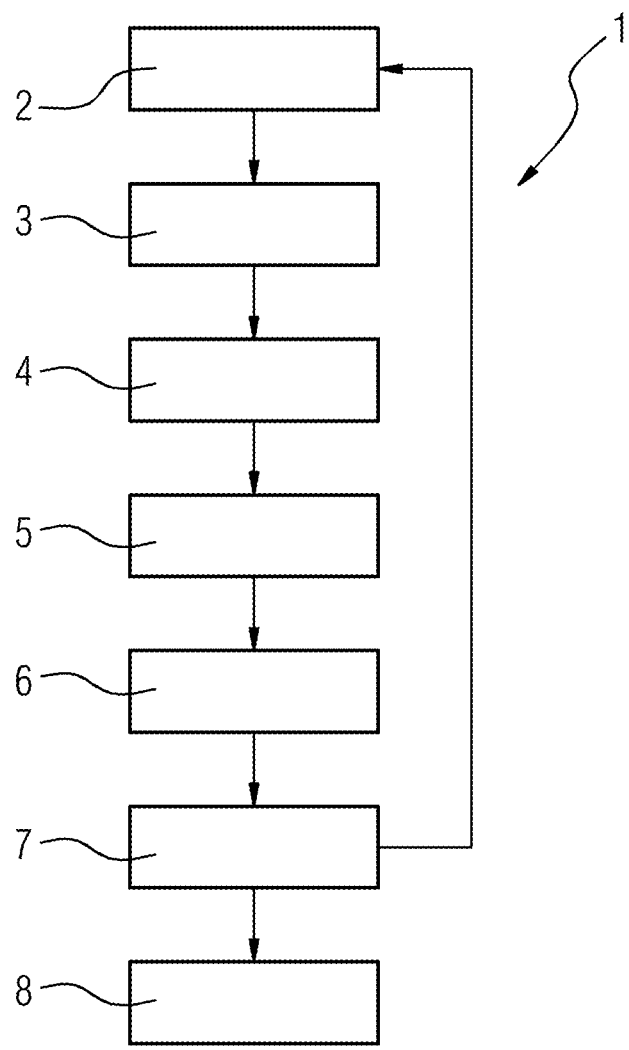
FIG. 1 shows a schematic representation of the method according to one or more example embodiments of the present invention.

One or more example embodiments of the present invention relates to a dose control method for a mobile x-ray detector of a medical x-ray system, having the steps:

Generating a data packet having a time stamp of a clock of the x-ray detector and a dose value, Sending the data packet via a radio link from the mobile x-ray detector to an x-ray generator, Receiving the data packet from the x-ray generator, Comparing the time stamp with a clock of the x-ray generator and in the process calculating a latency, Extrapolating an overall dose from the dose value, the time stamp and the latency.

According to one aspect of one or more example embodiments of the present invention, the steps are repeated iteratively until the overall dose corresponds to a target dose.

According to one aspect of one or more example embodiments of the present invention, the clock of the x-ray detector is synchronized with a clock of the x-ray generator.

According to one aspect of one or more example embodiments of the present invention, the synchronization accuracy essentially amounts to 1 μs. The synchronization accuracy may lie in the range of 0.5 μs to 1.5 μs.

According to one aspect of one or more example embodiments of the present invention, the dose value is an accumulated dose value. The accumulated dose value specifies the dose accumulated up to the time stamp.

According to one aspect of one or more example embodiments of the present invention, the data packets are generated and sent at regular intervals.

According to one aspect of one or more example embodiments of the present invention, the interval is essentially 10 μs. The interval may amount in particular to 5 μs to 15 μs.

According to one aspect of one or more example embodiments of the present invention, in the step of extrapolation, a start of the radiation, a temporal profile of the tube current, a temporal profile of the tube voltage or a constant tube voltage is also taken into account on the basis of a measured, modeled or extrapolated profile.

According to one aspect of one or more example embodiments of the present invention, in the step of extrapolation, a parameter of a calibration of a dose profile to be expected is also taken into account.

According to one aspect of one or more example embodiments of the present invention, the quality of the radio link is monitored on the basis of the time stamp.

According to one aspect of one or more example embodiments of the present invention, the radiation is interrupted or a dose value extrapolated in the case of a disturbed radio link.

One or more example embodiments of the present invention further relates to a mobile x-ray detector for carrying out a method according to one or more example embodiments of the present invention. The x-ray detector can be charged in a charging station. The x-ray detector can be connected via a radio link to the x-ray generator and possibly also to a control facility of the x-ray system.

One or more example embodiments of the present invention further relates to an in particular medical x-ray system having a mobile x-ray detector according to one or more example embodiments of the present invention. The x-ray system can be a mobile x-ray system. The x-ray system can alternatively comprise an x-ray source installed fixedly in the room with an x-ray generator. The x-ray detector can be placed on a couch, a bed or another surface for recording purposes, for instance.

The method can be based on a commercial transmission path such as e.g. WiFi (IEEE 802.11), as is already used nowadays for the transmission of the image data from the portable detector to the image system. In a first preparatory step, two clocks—one in the x-ray generator and one in the (x-ray) detector—are synchronized to an adequate accuracy, e.g. 1 µs. This can take place via known protocols such as e.g. the precision time protocol (PTP), see also IEEE 1588/IEC 61588.

As soon as the detector is prepared for the recording by the x-ray system, it may begin to send data packets with a current time stamp and an accumulated dose in rapid succession (e.g. every 10 µs) to the x-ray generator. The x-ray generator can process these packets and can on the one hand determine the current latency on the transmission path from the difference between its own clock and the received time stamps, on the other hand it can use the received dose values from the detector and information known thereto from the beam generation in order to extrapolate the time instant when the dose target value is probably reached on the detector.

In this case information relating to the start of the radiation, the temporal profile of the tube current and tube voltage, as well as their measured or modeled as well as extrapolated profiles (e.g. rise times specified by capacitances and inductances) can be used in particular by the generator in order to calculate as accurate an extrapolation of the time instant of the shut-down as possible. Furthermore, with the aid of calibration measurements the temporal profile of the dose to be expected can be predetermined up to the object-specific absorption, with the aid of which the effective attenuation of the object can be determined during the measurement and the shut-off accuracy can thus be improved.

Since the detector is able to send the measured values in quick succession, the generator can continuously refine its extrapolation of the time instant of the shut-off since the initial measured values will only contain a low detected dose and will therefore be afflicted with noise.

The x-ray generator can likewise constantly monitor the quality of the radio link on the basis of the time stamp received continuously by the detector and in particular identify a disturbed radio link very quickly. It can then either use the previously determined interpolation for the duration of the radiation, in order to switch to a two-point technology, or abort the recording.

The advantage with respect to the use of a proprietary radio protocol consists in the WiFi technology already available for image transmission also being usable to transmit the dose signal. As a result, costs are saved on the one hand, and on the other hand also the considerable efforts involved for the country-specific approval of a proprietary radio technology. Furthermore, the problem of possible disturbances between the WiFi technology for the image data transmission and the proprietary transmission path is superfluous for the dose measurement.

FIG. 1 shows an exemplary embodiment of an inventive dose control method 1 for a mobile x-ray detector of a medical x-ray system, having the steps:
Generating 2 a data packet having a time stamp of a clock of the x-ray detector and a dose value,
Sending 3 the data packet via a radio link from the mobile x-ray detector to an x-ray generator,
Receiving 4 the data packet from the x-ray generator,
Comparing 5 the time stamp with a clock of the x-ray generator and in the process calculating a latency,
Extrapolating 6 an overall dose from the dose value, the time stamp and the latency.

The steps are repeated iteratively until the overall dose corresponds to a target dose. The overall dose is compared with the target dose in step 7. As soon as the overall dose corresponds to the target dose or exceeds the same, the recording is terminated in step 8.

The clock of the x-ray detector is synchronized with a clock of the x-ray generator, wherein the synchronization accuracy essentially amounts to 1 µs. The dose value is an accumulated dose value. The data packets are generated and sent at regular intervals, wherein the interval essentially amounts to 10 µs.

In the step of extrapolation, a start of the radiation, a temporal profile of the tube current, a temporal profile of the tube voltage or a constant tube voltage is further taken into consideration on the basis of a measured, modeled or extrapolated profile. In the step of extrapolation, a parameter of a calibration of a dose profile to be expected is also taken into account.

On the basis of the time stamp, the quality of the radio link is monitored, wherein in the case of a disturbed radio link, the radiation is interrupted or a dose value is extrapolated.

Figure 2:
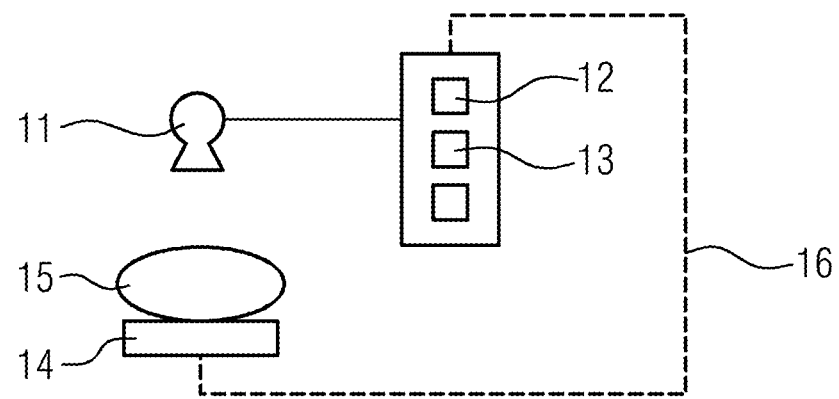
FIG. 2 shows a schematic representation of the x-ray system according to one or more example embodiments of the present invention.

FIG. 2 shows an exemplary embodiment of an inventive x-ray system 10. The x-ray system 10 comprises an x-ray source 11, an x-ray generator 12, a control facility 13, an x-ray detector 14 and a radio link 16 between the x-ray detector 14 and the x-ray generator 12.

Although the present invention has been disclosed in the form of preferred embodiments and variations thereon, it will be understood that numerous additional modifications and variations could be made thereto without departing from the scope of the invention. For the sake of clarity, it is to be understood that the use of "a" or "an" throughout this application does not exclude a plurality, and "comprising" does not exclude other steps or elements. The expression "a number of" means "at least one". The mention of a "unit" or a "device" does not preclude the use of more than one unit or device. The expression "a number of" has to be understood as "at least one".

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the invention has been described in detail with one or more example embodiments, the invention is not restricted by the examples given and other variations can be derived therefrom by a person skilled in the art without departing from the protective scope of the invention.

The invention claimed is:

1. A dose control method for a mobile x-ray detector of a medical x-ray system, the method comprising:
generating a data packet having a time stamp of a clock of the mobile x-ray detector and a dose value;
sending the data packet via a radio link from the mobile x-ray detector to an x-ray generator;
receiving the data packet from the x-ray generator;
comparing the time stamp with a clock of the x-ray generator and calculating a latency; and
extrapolating an overall dose from the dose value, the time stamp and the latency.

2. The method of claim 1, wherein the generating, the sending, the receiving, the comparing and the extrapolating are repeated iteratively until the overall dose corresponds to a target dose.

3. The method of claim 2, wherein the clock of the x-ray detector is synchronized with a clock of the x-ray generator.

4. The method of claim 3, wherein the synchronization accuracy essentially amounts to 1 µs.

5. The method of claim 4, wherein the dose value is an accumulated dose value.

6. The method of claim 5, wherein the data packets are generated and sent at regular intervals.

7. The method of claim 6, wherein the interval essentially amounts to 10 µs.

8. The method of claim 7, wherein the extrapolating uses a start of radiation, a temporal profile of a tube current, a temporal profile of a tube voltage or a constant tube voltage based on a measured, modeled or extrapolated profile.

9. The method of claim 8, wherein the extrapolating is based on a parameter of a calibration of a dose profile to be expected.

10. The method of claim 1, wherein the clock of the x-ray detector is synchronized with a clock of the x-ray generator.

11. The method of claim 10, wherein the synchronization accuracy essentially amounts to 1 µs.

12. The method of claim 1, wherein the dose value is an accumulated dose value.

13. The method of claim 1, wherein the data packets are generated and sent at regular intervals.

14. The method of claim 13, wherein the interval essentially amounts to 10 µs.

15. The method of claim 1, wherein the extrapolating uses a start of radiation, a temporal profile of a tube current, a temporal profile of a tube voltage or a constant tube voltage based on a measured, modeled or extrapolated profile.

16. The method of claim 1, wherein the extrapolating is based on a parameter of a calibration of a dose profile to be expected.

17. The method of claim 1, wherein a quality of the radio link is monitored based on the time stamp.

18. The method of claim 1, wherein in a case of a disturbed radio link, radiation is interrupted or a dose value is extrapolated.

19. A mobile x-ray detector configured to perform the method of claim 1.

20. An x-ray system comprising:
the mobile x-ray detector of claim 19.

* * * * *